United States Patent
Chung et al.

(10) Patent No.: US 7,054,553 B2
(45) Date of Patent: May 30, 2006

(54) APPARATUS FOR MONITORING POLARIZATION-MODE DISPERSION AND CHROMATIC DISPERSION AND TRANSMITTING MEANS FOR TRANSMITTING OPTICAL SIGNAL IN OPTICAL NETWORK

(75) Inventors: Yeun-Chol Chung, Daejon (KR); Keun-Ju Park, Mokpo (KR); Hun Kim, Goyang (KR); Jun-Heang Lee, Kyunggi-do (KR); Chun-Ju Yun, Daejon (KR); Seung-Kyun Shin, Daejon (KR)

(73) Assignee: Teralink Communicaitons . Inc., Daejeon (KR)

( * ) Notice: Subject to any disclaimer, the term of this patent is extended or adjusted under 35 U.S.C. 154(b) by 540 days.

(21) Appl. No.: 10/091,010

(22) Filed: Mar. 6, 2002

(65) Prior Publication Data

US 2002/0126351 A1    Sep. 12, 2002

(30) Foreign Application Priority Data

Mar. 7, 2001    (KR)    ............................. 2001-11721

(51) Int. Cl.
*H04B 10/08*    (2006.01)
*H04B 17/00*    (2006.01)

(52) U.S. Cl. ........................................................ 398/29
(58) Field of Classification Search ................ 398/29, 398/17, 25, 27, 32, 33, 81, 147, 152, 159, 398/183–185
See application file for complete search history.

(56) References Cited

U.S. PATENT DOCUMENTS

| | | | | |
|---|---|---|---|---|
| 4,768,186 A | * | 8/1988 | Bodell | 398/76 |
| 5,872,647 A | * | 2/1999 | Taga et al. | 398/185 |
| 5,949,560 A | * | 9/1999 | Roberts et al. | 398/29 |
| 6,081,360 A | * | 6/2000 | Ishikawa et al. | 398/147 |
| 6,829,440 B1 | * | 12/2004 | Ooi et al. | 398/148 |
| 2002/0015207 A1 | * | 2/2002 | Ooi et al. | 359/161 |

* cited by examiner

*Primary Examiner*—Jason Chan
*Assistant Examiner*—Quan-Zhen Wang
(74) *Attorney, Agent, or Firm*—Greenblum & Bernstein, P.L.C.

(57) ABSTRACT

An apparatus for monitoring polarization-mode dispersion and chromatic dispersion in optical networks in accordance with the present invention comprises; an optical distributor for distributing input optical signals, a first light receiver for photoelectrically converting the optical signals distributed by the distributor, a second light receiver for photoelectrically converting the optical signals to measure the average power of the optical signals distributed by the distributor, a filter for filtering output signals from the first light receiver, a power meter for measuring the frequency band of the optical signals filtered by the filter, an analog-to-digital (A/D) converter for converting the analog signals from the first and the second receivers into digital signals, a microprocessor for monitoring the polarization-mode dispersion and the chromatic dispersion of the optical signals by means of the digital signals from the A/D converter, and further a polarization scrambler in the optical signal sending-end.

12 Claims, 4 Drawing Sheets

APPARATUS FOR MONITORING POLARIZATION-MODE DISPERSION AND CHROMATIC DISPERSION AND TRANSMITTING MEANS FOR TRANSMITTING OPTICAL SIGNAL IN OPTICAL NETWORK

BACKGROUND OF THE INVENTION

1. Field of the Invention

The present invention relates to an apparatus for monitoring optical signal performance for operation/maintenance/management of optical communication networks. More particularly, the invention relates to a monitoring apparatus detecting optical signal distortions due to polarization-mode dispersion and chromatic dispersion and indicating the magnitudes of polarization-mode dispersion and chromatic dispersion by means of measuring the power over the signal frequency band of interest and using the polarization scrambling technique at the sending-end.

2. Description of the Related Art

Wavelength division multiplexing (WDM) scheme based optical networks are efficient high-speed broadband networks that transmit high-speed optical signals by allocating a plurality of wavelengths on one communication channel. In the recent information society, as demand for various kinds of data services such as Internet and high-quality video service has shown a dramatic increase, data transfer for these services has begun to require high-speed and large capacity broadband optical networks. To accommodate this type of data, transmission rate per channel in WDM optical networks has increased accordingly. In high-speed optical networks, optical signal distortion due to the polarization-mode dispersion and the chromatic dispersion occurring in an optical fiber affects the quality of optical signals. The polarization-mode dispersion limits the allowable maximum transmission distance and aggravates transmission quality by causing expansion of pulse width of the light signal being modulated into the square wave along with the chromatic dispersion in optical transmission systems. Polarization-mode dispersion and chromatic dispersion are ever becoming a serious problem as the networks demand larger capacity and higher speed.

Polarization-mode dispersion and chromatic dispersion might change by a large amount in case of network reconstruction such as replacing optical fiber and also they may change from time to time as the temperature of the network environment changes. For example, the total dispersion of a 500 km long LEAF (Large Effective Area Fiber) can change as much as 80 ps/nm for a temperature change of 40 degrees. This amount exceeds the permissible dispersion of a system having channel transmission rate of 40 Gb/s. Also, the polarization-mode dispersion of optical fiber undergoes stochastic changes due to fiber's structural incompleteness, pinch, bending, twist, pressure, temperature, etc. And it is probabilistically known to be about 21 minutes a year when the temporal value of polarization-mode dispersion is larger than 3 times the year-average value. This much probability can cause a little bit of penalty to a system with channel transmission rate of 2.5 Gb/s when existing fibers with a large polarization-mode dispersion is used for a long transmission distance of 640 km. It can also cause a little bit of penalty to a system using currently available low polarization-mode dispersion fiber if the channel transmission rate reaches 40 Gb/s. Therefore, it is apparently needed to constantly monitor the polarization-mode dispersion and the chromatic dispersion of optical signal in high-speed optical networks.

The techniques for measuring the polarization-mode dispersion of optical elements in the prior art include; a method in which polarization change is measured against wavelength of a light source after passing the light source with a fixed polarization through an object element of interest for measuring, and a method in which change of the polarization state of the light is directly observable as to the light wavelength using wavelength tunable laser and polarimetric analyzer.

Recently, a method has been proposed to monitor distortion of optical signals due to polarization-mode dispersion when the light signal passes through optical fibers having polarization-mode dispersion in optical networks. In this method the signal distortion due to polarization-mode dispersion is monitored by measuring the change of power over the signal frequency band that is caused by the distortion of optical signals due to polarization-mode dispersion.

The aforementioned prior art is about methods to simply measure the polarization-mode dispersion of optical fibers or to monitor the signal distortion due to polarization-mode dispersion. But these methods are unable to monitor the polarization-mode dispersion value of the optical signal when it passes through various optical fibers. So far, no methods of monitoring polarization-mode dispersion for these cases have been disclosed. Accordingly, the methods in the prior art could not discern other factors such as chromatic dispersion which affects distortion of optical signals. As the optical signal passes through optical fibers, the phase of each frequency component is modulated due to the chromatic dispersion of optical fibers. If this signal is photoelectrically converted in the light receiver, the power of electric signals changes according to the chromatic dispersion value of optical fibers. Consequently, the monitoring methods in the prior art were not able to discern the optical signal distortion caused by polarization-mode dispersion from that by chromatic dispersion.

SUMMARY OF THE INVENTION

It is an object of the present invention to provide an apparatus for monitoring polarization-mode dispersion and chromatic dispersion by distinguishing effects due to polarization-mode dispersion and chromatic dispersion using the polarization scrambling technique in wavelength division multiplexing (WDM) optical networks and thereby measuring the polarization-mode dispersion and the chromatic dispersion at the same time.

To achieve the aforementioned object, a monitoring apparatus for polarization-mode dispersion and chromatic dispersion in optical networks in accordance with the present invention comprises; an optical distributor for distributing input optical signals, a first light receiver for photoelectrically converting the optical signals distributed by the distributor, a second light receiver for photoelectrically converting the optical signals to measure the average power of the optical signals distributed by the distributor, a filter for filtering output signals from the first light receiver, a power meter for measuring the frequency band of the optical signals filtered by the filter, an analog-to-digital (A/D) converter for converting the analog signals from the first and the second receivers into digital signals, a microprocessor for monitoring the polarization-mode dispersion and the chromatic dispersion of the optical signals by means of the digital signals from the A/D converter, and further a polarization scrambler in the optical signal sending-end.

The above and other features and advantages of the present invention will be more clearly understood for those skilled in the art from the following detailed description taken in conjunction with the accompanying drawings, which form parts of this disclosure.

DETAILED DESCRIPTION OF THE EMBODIMENT

Hereinafter, the present invention is described in detail through preferred embodiments by referring to the accompanying drawings.

Figure 1:
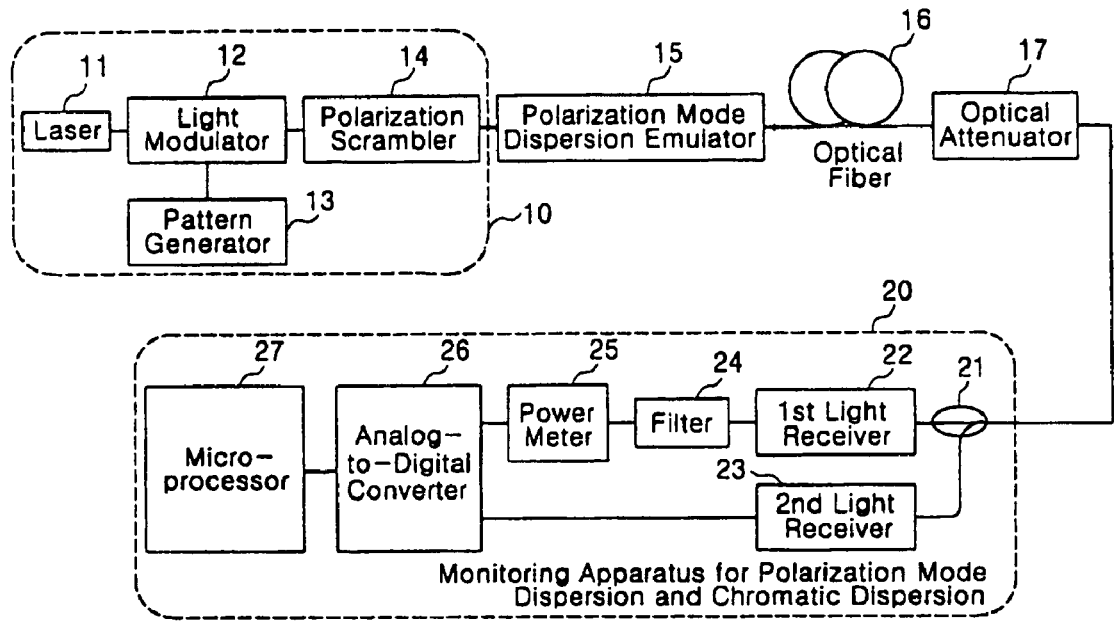
FIG. 1 is a configuration diagram of a monitoring apparatus embodied in accordance with the present invention.

FIG. 1 is a diagram illustrating the configuration of a monitoring apparatus in accordance with the present invention and illustrates generally how the apparatus is constituted to monitor optical signals for their polarization-mode dispersion and chromatic dispersion.

The constitution of FIG. 1 is composed, in a broad sense, of a transmitting means (10) for transmitting data in the form of optical signals through an optical fiber and a monitoring device (20) for monitoring the optical signals for their polarization-mode dispersion and chromatic dispersion after photoelectric conversion thereof.

The transmitting means (10) in the present invention is similar in its function to that in the prior art, but further comprise a polarization scrambler (14) adopting the polarization scrambling technique that allows the transmitting optical signals to be polarized in a plurality of directions not limited to just one specific direction. This kind of polarization scrambler (14) modulates the optical signals so as to contain all states of polarization.

Generally, lasers used at the sending-ends of optical networks output optical signals polarized at a certain direction. A polarization scrambler (14) receives this optical signal polarized at a certain direction and outputs the optical signals in polarization states of all directions along with time. This polarization scrambler (14) may be constituted with a quarter wavelength ($\lambda/4$) plate or a half wavelength ($\lambda/2$) plate. By adjusting these wavelength plates, the optical signals can be made to have polarization states of all directions along with time.

In the monitoring device (20), an optical distributor (21) branches out the signals that have passed through an optical fiber and an optical attenuator into two parts. The optical distributor (21) can be implemented by an optical coupler, which extracts signals at a constant rate.

A first light receiver (22) and a second light receiver (23) photoelectrically convert the branched-off optical signals, respectively. The first light receiver (22) converts the branched-off optical signals into electric signals so as to measure the signal over the frequency band of the optical signals of interest, while the second light receiver (23) does the same so as to measure the average power of the other branched-off optical signals.

A filter (24) performs electric filtering of the output signals from the first light receiver (22) and passes only the frequency band of interest for measuring. The center frequency here falls within the frequency band of the transfer data generated by a pattern generator (13). A power meter (25) measures the power of the electric signals over the frequency band of interest.

An A/D converter (26) converts electrical analog signals applied by the power meter (25) and the second light receiver (23) into digital signals. A microprocessor (27) performs simple arithmetic operations on the digitized data, thereby monitoring the optical signals passed through the optical fiber (16) for its polarization-mode dispersion and chromatic dispersion.

Optical output of the laser (11) that converts electric signals into optical signals is inputted to an optical modulator (12). Said pattern generator (13) generates the transmission data signals and then activates the light modulator (12) at transmission rate of 20 Gbps. Optical signals modulated at a light modulator (12) is now applied to a polarization scrambler (14) so that the optical signals are modulated to have the polarization state in all directions not limited to a specific polarization direction. This polarization scrambler (14) may be constituted with a $\lambda/4$-plate or $\lambda/2$-plate. The optical signals scrambled by the polarization scrambler (14) are put through a polarization-mode dispersion emulator (15), thereby incurring polarization-mode dispersion. The polarization-mode dispersion emulator (15) has a function of generating emulated polarization-mode dispersion in the optical fiber. The optical signals once having polarization-mode dispersion is made to have chromatic dispersion by a subsequent transmitting through an optical fiber (16). The optical signals transmitted to an optical fiber (16) is put through an optical attenuator (17) and then input to a monitoring apparatus (20) for polarization-mode dispersion and chromatic dispersion in accordance with the present invention. After the optical signals pass through the optical fiber with polarization-mode dispersion as mentioned before, the power of the optical signals, P(f), photoelectrically converted at the first light receiver (22), can be represented by expression 1.

$$P(f) \propto 1-4\gamma(1-\gamma)\sin^2(\pi f \Delta \tau) \quad \text{[Expression 1]}$$

In expression 1, f indicates frequency, γ indicates power ratio of optical signal inputs in two polarization axes of the optical fiber, and Δτ indicates polarization-mode dispersion, respectively.

As optical signals pass through the optical fiber having chromatic dispersion as well as polarization-mode dispersion, the power photoelectrically converted at the first light receiver (22) can be represented as in expression 2.

$$P(f) \propto \cos(\pi c DL(f/f_0)^2), \quad \text{[Expression 2]}$$

where c indicates the speed of light, D indicates chromatic dispersion coefficient of optical fiber in ps/km/nm, L indicates length of optical fiber, and $f_0$ indicates optical frequency of optical signal, respectively.

Therefore, when optical signals having both polarization-mode dispersion and chromatic dispersion are received at the first light receiver (22) as in FIG. 1, the output signal power from the first light receiver (22) can be represented as follows.

$$P(f) \propto [1-4\gamma(1-\gamma)\sin^2(\pi f \Delta \tau)][\cos(\pi c DL(f/f_0)^2)] \quad \text{[Expression 3]}$$

Therefore, both polarization-mode dispersion and chromatic dispersion at the same time affect power of the received optical signals. If the polarization scrambling technique is used as in FIG. 1, there exist the cases where γ becomes either 0 or 1, or 0.5. If the power of optical signals inputted to the optical fiber proceeds on only one of the two polarization axes, i.e., all on x-axis or all on y-axis, γ becomes either 0 or 1. If the power of optical signals proceeds equally on the two polarization axes, γ becomes 0.5. If γ becomes either 0 or 1, the output signal power at the first light receiver (22) corresponds to the maximum value, $P(f)_{max}$. On the other hand, if γ becomes 0.5, the output signal power will correspond to the minimum value, $P(f)_{min}$. These relations can be expressed as follows.

$$P(f)_{max} \propto \cos(\pi c DL(f/f_0)^2)$$

$$P(f)_{min} \propto [\cos^2(\pi f \Delta \tau)][\cos(\pi c DL(f/f_0)^2)] \quad \text{[Expression 4]}$$

Therefore, obtaining the ratio between maximum and minimum powers can monitor the polarization-mode dispersion value, and the chromatic dispersion can be monitored from the maximum power.

The polarization-mode dispersion, Δτ, and the chromatic dispersion, DL, can be obtained by use of expression 4, as follows.

$$\Delta\tau = \cos^{-1}(2P(f)_{min}/P(f)_{max}-1)/(2\pi f)$$

$$DL \propto P(f)_{max} \quad \text{[Expression 5]}$$

Therefore, the polarization-mode dispersion can be monitored by using the polarization scrambling technique and measuring the output signal power at the first light receiver (22) as shown in FIG. 1. If other factors that may affect the output signal power at the first light receiver (22) are ignored to be minimal, the chromatic dispersion can be monitored simultaneously.

The constitution of the monitoring device (20) for polarization-mode dispersion and chromatic dispersion shown in FIG. 1 is explained in more detail in the following.

An optical distributor (21) extracts the optical signal to input to the monitoring device (20) at a specified rate. One part of the extracted signals is fed to a first light receiver (22) to measure the radio frequency (RF) power of the optical signals, while the other part is fed to a second light receiver (23) to measure the average power of the optical signals.

Therefore, the first light receiver (22) should be able to measure high frequency signals so as to measure the RF power of the received optical signals. In order to measure the average power of the signals, the output signals photoelectrically converted at the second light receiver (23) are fed to an A/D converter (26) for digitizing, and then input to a microprocessor (27) where the signal average power is measured. In order to measure the RF power of the optical signals, the output signals photoelectrically converted at the first light receiver (22) are filtered electrically at a filter (24) for a specified frequency band for measuring, and then are fed to a power meter (25). Here, the center frequency of the filter (24) is covered under the frequency band of the data signals generated in the pattern generator (13) To select frequency components in a frequency band around 10 GHz, an embodiment in accordance with the present invention uses a filter (24) with center frequency of 10 GHz and bandwidth of 0.3 GHz. Filtered signals at the filter (24) are input to the power meter (25) for measuring the RF power, and the output signals thereof are digitized at the A/D converter (26) and then is fed to the microprocessor (27). The microprocessor (27) performs simple arithmetic operations such as in Eq. 5 and thereby monitors polarization-mode dispersion and chromatic dispersion.

Figure 2:
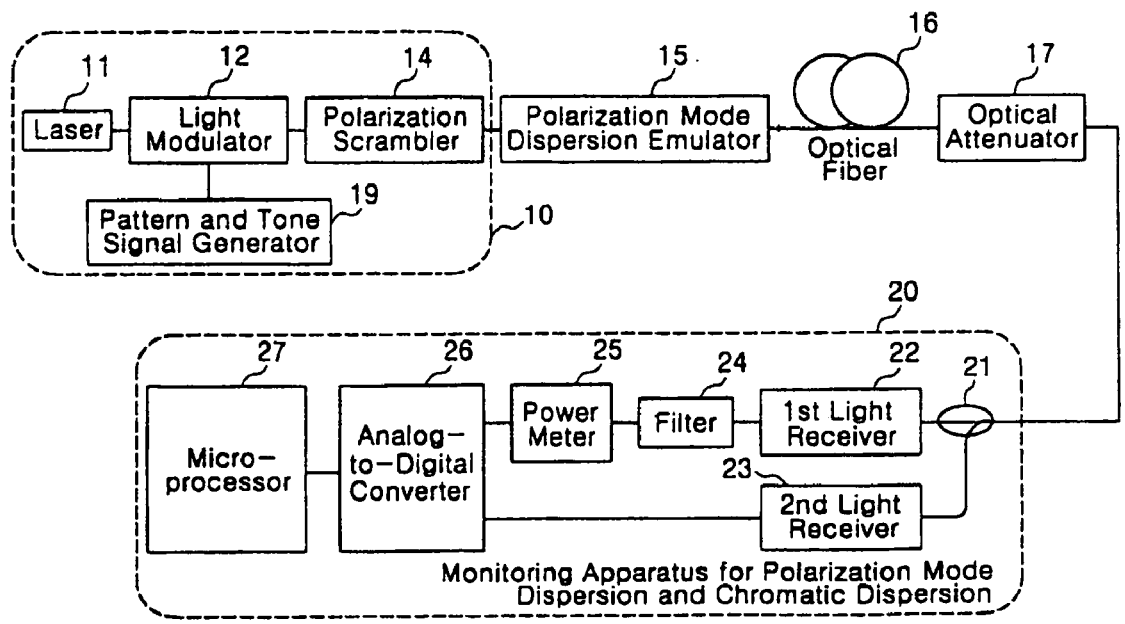
FIG. 2 is a configuration diagram of another embodiment in accordance with the present invention.

FIG. 2 is a configuration diagram of another embodiment in accordance with the present invention, which monitors polarization-mode dispersion and chromatic dispersion using high frequency pilot tone. The principle of measuring polarization-mode dispersion and chromatic dispersion of optical signals by using the polarization scrambling technique and measuring the output powers from light receivers (22, 23) is identical to that of FIG. 1. In FIG. 2, a pattern and tone signal generator (19), which generates pilot tone signals as well as transmission data signals at the same time, replaces the pattern generator (13), and thereby applies to the signals with extra pilot tone signals in addition to the data signal in the transmitting means (10). Hence, the monitoring device (20) can monitor the values of polarization-mode dispersion and chromatic dispersion by measuring the power of amplitude-modulated pilot tone. Here, the frequency of pilot tone is set to be higher than that of the data signals to avoid signal interference. If data transmission speed is 20 Gbps for example, the pilot tone frequency is preferred to be higher than at least 20 GHz. Also, the center frequency of the filter (24) in the monitoring device (20) for polarization-mode dispersion and chromatic dispersion should correspond to the pilot tone frequency. By using this high-frequency pilot tone, measurement resolution for polarization-mode dispersion and chromatic dispersion by the monitoring device can be further enhanced.

Figure 3:
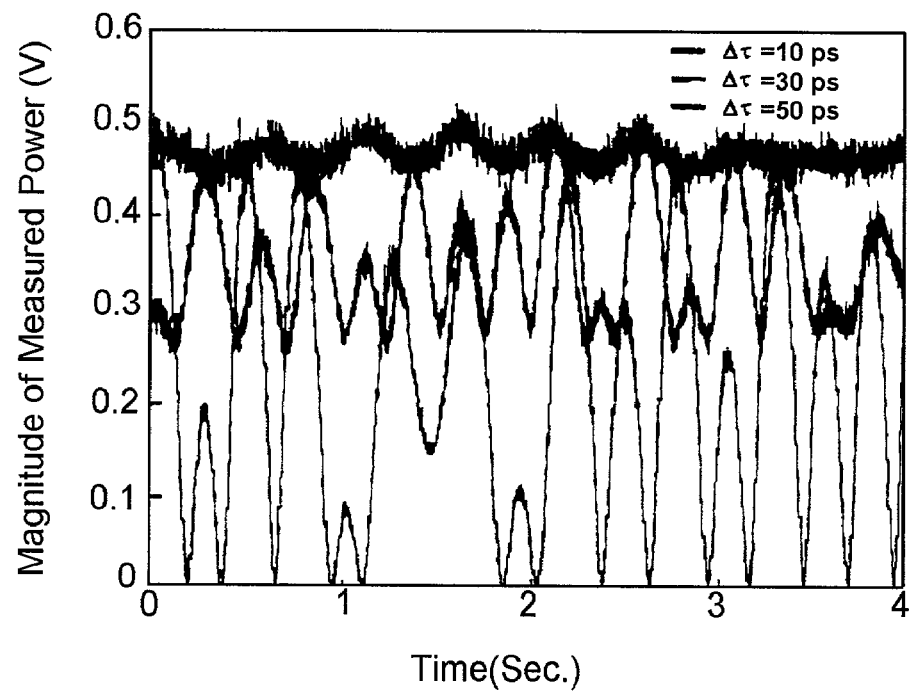
FIG. 3 illustrates the power measured at the power meter for the modulated optical signals that have passed through only the polarization-mode dispersion emulator.

FIG. 3 illustrates the power measured by the power meter (25), for the modulated optical signals that have passed through only the polarization-mode dispersion emulator (15). In FIG. 3, the power magnitude shows maxima and minima along with time, which are caused as an effect of the polarization scrambling. The ratio between the maximum and the minimum is varied with values of polarization-mode dispersion as shown in FIG. 3, and therefrom monitoring of polarization-mode dispersion is available.

Figure 4:
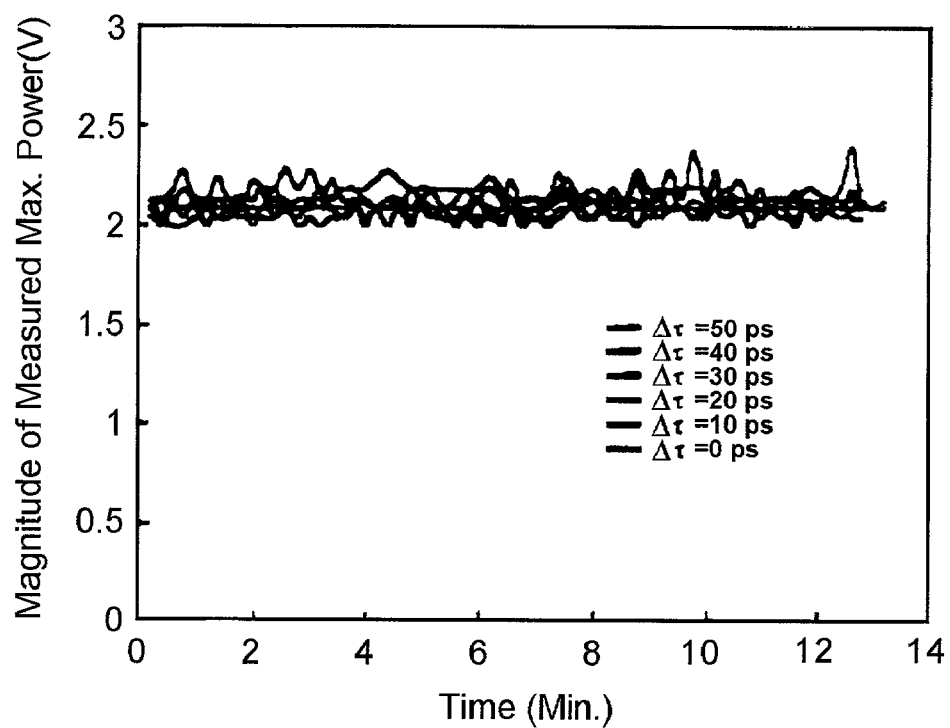
FIG. 4 illustrates the maximum power measured at the power meter for the modulated optical signals that have passed through the polarization-mode dispersion emulator and the single-mode optical fiber having chromatic dispersion of 345 ps/nm.

FIG. 4 illustrates the maximum power measured at the power meter (25) for the modulated optical signals that have passed through the polarization-mode dispersion emulator (15) and the single-mode optical fiber having chromatic dispersion of 345 ps/nm. It can be noticed in FIG. 4 that the measured maximum power does not change even though the value of polarization-mode dispersion changes. Therefore, the effect due to chromatic dispersion is discernable by measuring the maximum power even under existence of polarization-mode dispersion.

Figure 5:
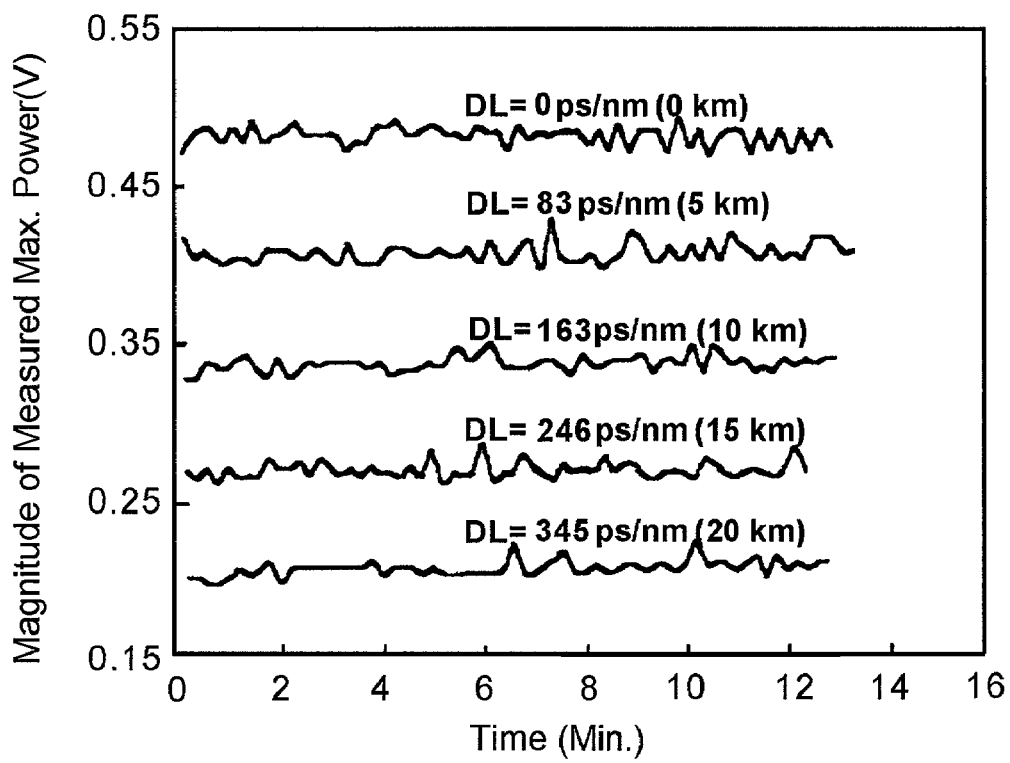
FIG. 5 illustrates the maximum power measured at the power meter for the modulated optical signals that have passed through the polarization-mode dispersion emulator and the single-mode optical fibers with various values of chromatic dispersion.

FIG. 5 illustrates the maximum power measured at the power meter (25) for the modulated optical signals that have passed through the polarization-mode dispersion emulator (15) and the single-mode optical fibers with varied values of chromatic dispersion. The polarization-mode dispersion value for this emulator is 50 ps. The measured maximum power decreases as the chromatic dispersion of the optical fibers increases as can be noticed in FIG. 5, and thereby monitoring of chromatic dispersion is available by measuring the maximum power.

Figure 6:
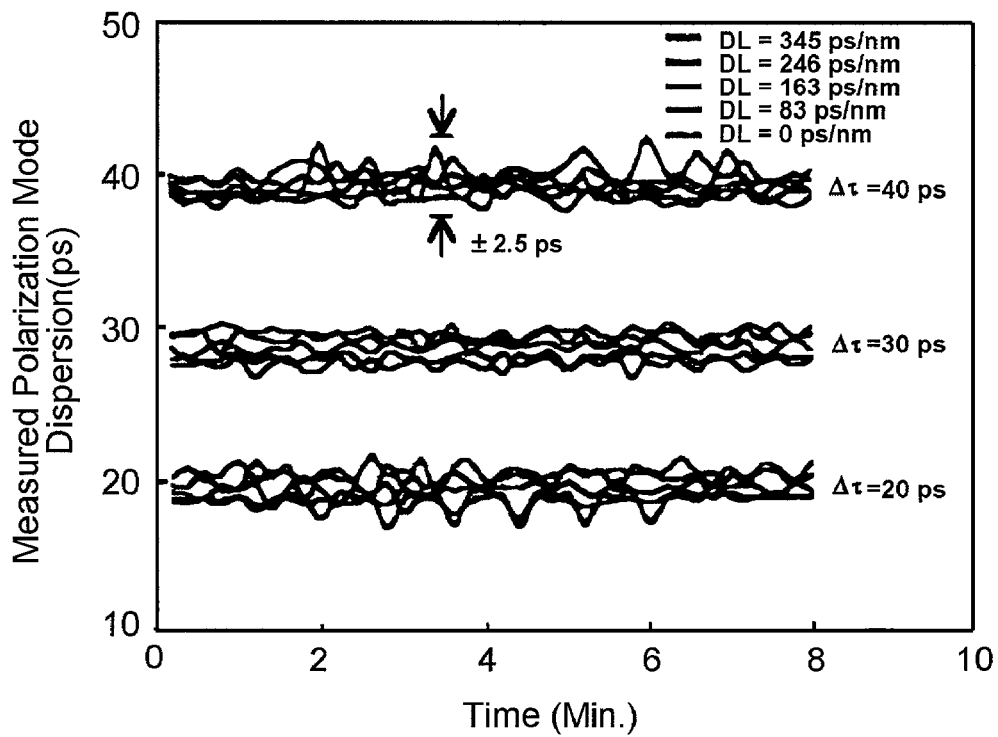
FIG. 6 illustrates the polarization-mode dispersion measured after passing through the single-mode optical fibers with various values of chromatic dispersion and the emulator, of which polarization-mode dispersion has changed to 20 ps, 30 ps, and 40 ps, respectively.

FIG. 6 illustrates the polarization-mode dispersion measured after passing through single-mode optical fibers with various values of chromatic dispersion and the emulator, of which the polarization-mode dispersion has changed to 20 ps, 30 ps, and 40 ps, respectively. As shown in the figure, the measurement error bound for polarization-mode dispersion is ±2.5 ps.

Figure 7:
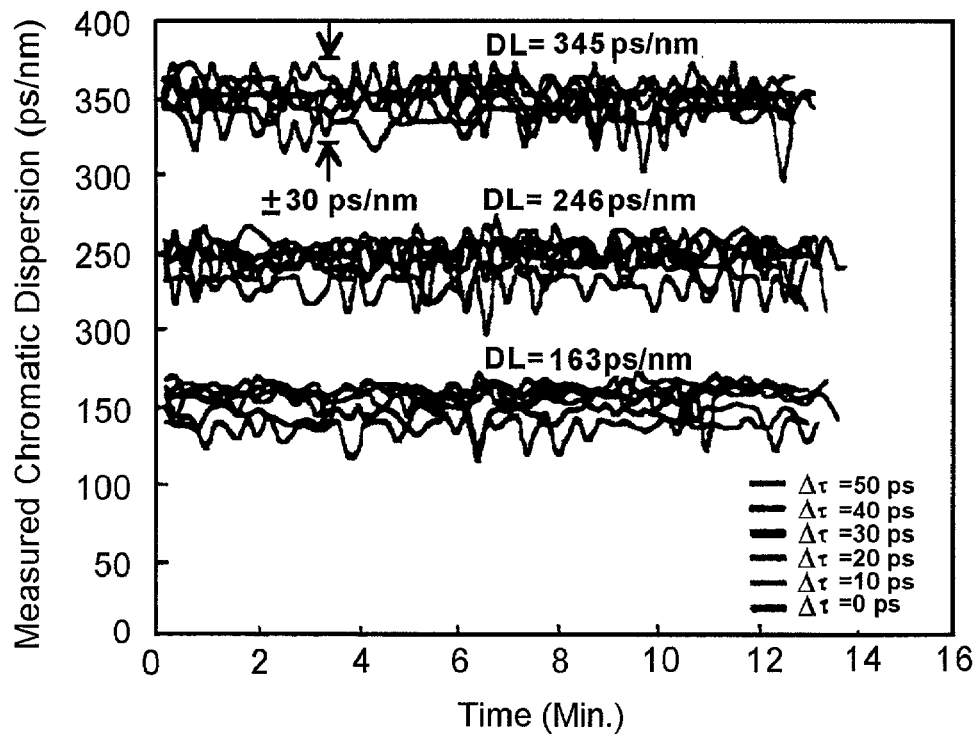
FIG. 7 illustrates the chromatic dispersion measured for the modulated optical signals after passing through optical fibers with various values of chromatic dispersion, each of those fibers having various values of polarization-mode dispersion.

FIG. 7 illustrates the chromatic dispersion measured for modulated optical signals after passing through optical fibers with various values of chromatic dispersion, each of those fibers having various values of polarization-mode dispersion. As shown in the figure, the measurement error bound for chromatic dispersion is ±25 ps/nm.

Figure 8:
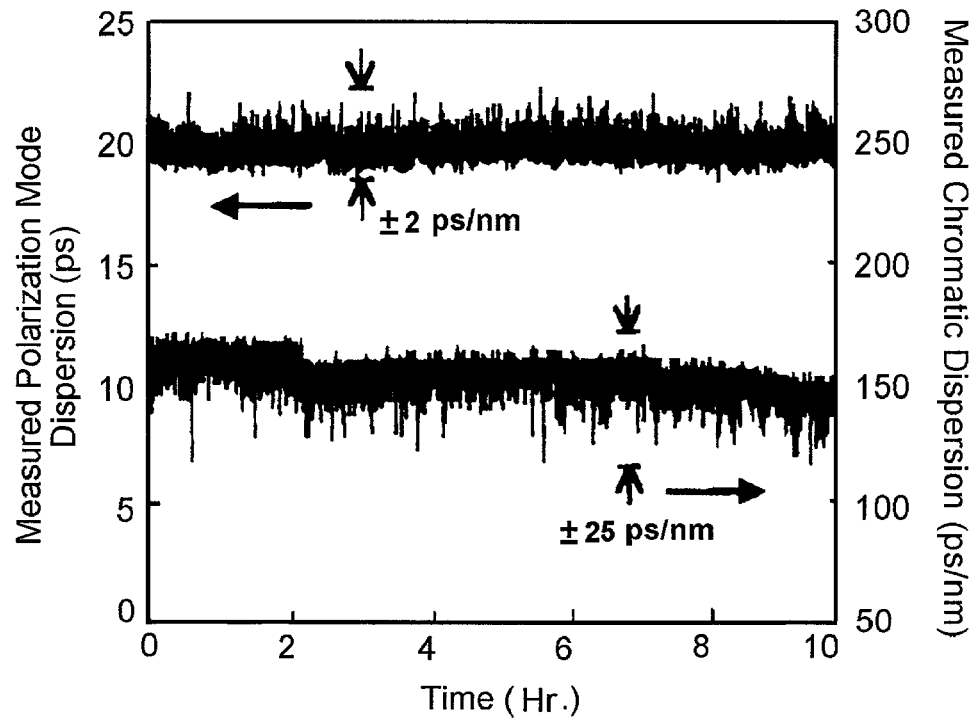
FIG. 8 illustrates the polarization-mode dispersion and the chromatic dispersion measured for the modulated optical signal after passing through an emulator having polarization-mode dispersion of 20 ps and a single-mode optical fiber having chromatic dispersion of 150 ps/nm.

FIG. 8 illustrates the polarization-mode dispersion and the chromatic dispersion measured for the modulated optical signals after passing through an emulator (15) having polarization-mode dispersion of 20 ps and a single-mode optical fiber having chromatic dispersion of 150 ps/nm. As shown in the figure, the measurement error bounds are ±2.5 ps for polarization-mode dispersion and ±25 ps/nm for chromatic dispersion over 10 hours of extensive measurement, respectively.

As described above, the apparatus for monitoring polarization-mode dispersion and chromatic dispersion in accordance with the present invention has beneficial effects in efficient operation/maintenance/management of optical networks by monitoring polarization-mode dispersion and chromatic dispersion at the same time for the optical signals in wavelength-division-multiplexed optical networks. In particular, the present invention allows compact and efficient embodiments by digitizing the output signal power by an A/D converter and then using a microprocessor.

Although the present invention has been described and illustrated in connection with the specific embodiments, it will be apparent for those skilled in the art that various modifications and changes may be made without departing from the ideas of the present invention set forth in this disclosure.

What is claimed is:

1. A monitoring apparatus for monitoring polarization-mode dispersion and chromatic dispersion of optical signals in wavelength division multiplexing (WDM) optical networks, the monitoring apparatus comprising:
   an optical distributor for distributing optical signals;
   a first light receiver for photoelectrically converting the optical signals to measure a frequency band of the optical signals distributed by said optical distributor;
   a second light receiver for photoelectrically converting the optical signals to measure an average power of the optical signals distributed by said optical distributor;
   a filter for passing output signals of said first light receiver over the frequency band of interest for measuring;
   a power meter for measuring signal power over the frequency band filtered by said filter;
   an analog-to-digital (A/D) converter for converting analog signals from said first and second receivers into digital signals; and
   a microprocessor for measuring average power of the optical signals by using the digital signals from said A/D converter and monitoring polarization-mode dispersion and chromatic dispersion using power values measured by said power meter;
   wherein said power meter produces a maximum power value ($P(f)_{max}$) and a minimum power value ($P(f)_{min}$) of the signals outputted from said first light receiver according to a polarization scrambling technique, said maximum and minimum power values being defined as:

$$P(f)_{max} \propto \cos(\pi cDL(f/f_0)^2)$$

$$P(f)_{min} \propto [\cos^2(\pi f\Delta\tau)][\cos \pi cDL(f/f_0)^2)]$$

where c indicates a speed of light, D indicates a chromatic dispersion coefficient of an optical fiber in ps/km/nm, L indicates a length of the optical fiber, f indicates a frequency, and $f_0$ indicates an optical frequency of optical signals.

2. The monitoring apparatus of claim 1, wherein said microprocessor monitors the polarization-mode dispersion by a ratio of the maximum power value ($P(f)_{max}$) and the minimum power value ($P(f)_{min}$), which are measured by said power meter, and monitors chromatic dispersion by the maximum power value, said polarization-mode dispersion ($\Delta\tau$) and said chromatic dispersion (DL) being defined as:

$$\Delta\tau = \cos^{-1}(2\ P(f)_{min}/P(f)_{max}^{-1})/(2\pi f)$$

$$DL \propto P(f)_{max}.$$

3. The monitoring apparatus of claim 1, wherein said optical distributor is an optical coupler that extracts optical signals received at a constant rate.

4. The monitoring apparatus of claim 1, wherein said filter has a center frequency falling within the frequency band of data signals when the data signals are applied to the received optical signals.

5. The monitoring apparatus of claim 1, wherein a center frequency of said filter corresponds to a frequency of a high-frequency pilot tone when data signals and extra pilot tone signals are applied to the received optical signals.

6. The monitoring apparatus according to claim 1, wherein the filter passes only over the frequency band of interest for measuring.

7. A monitoring apparatus for monitoring polarization-mode dispersion and chromatic dispersion of optical signals in wavelength division multiplexing (WDM) optical networks, comprising:
   an optical distributor that distributes optical signals;
   a first light receiver that photoelectrically converts the optical signals to measure a frequency band of the optical signals distributed by said optical distributor;
   a second light receiver that photoelectrically converts the optical signals to measure an average power of the optical signals distributed by said optical distributor;
   a filter that passes output signals of said first light receiver over the freguency band of interest for measuring;
   a power meter that measures signal power over the frequency band filtered by said filter;
   an analog-to-digital (A/D) converter that converts analog signals from said first and second receivers into digital signals; and
   a microprocessor that measures an average power of the optical signals by using the digital signals from said A/D converter and monitoring polarization-mode dispersion and chromatic dispersion using power values measured by said power meter;

wherein said power meter produces a maximum power value ($P(f)_{max}$) and a minimum power value ($P(f)_{min}$) of the signals outputted from said first light receiver according to a polarization scrambling technique, said maximum and minimum power values being defined as:

$$P(f)_{max} \propto \cos(\pi c DL(f/f_0)^2)$$

$$P(f)_{min} \propto [\cos^2(\pi f \Delta\tau)][\cos \pi cDL (f/f_0)^2)]$$

where c indicates a speed of light, D indicates a chromatic dispersion coefficient of an optical fiber in ps/km/nm, L indicates a length of the optical fiber, f indicates a frequency, and $f_0$ indicates an optical frequency of optical signals, and said optical signals are modulated by a polarization scrambler to have a polarization state in every direction.

8. The monitoring apparatus of claim 7, wherein said microprocessor monitors the polarization-mode dispersion by a ratio of the maximum power value ($P(f)_{max}$) and the minimum power value ($P(f)_{min}$), which are measured by said power meter, and monitors chromatic dispersion by the maximum power value, said polarization-mode dispersion ($\Delta\tau$) and said chromatic dispersion (DL) being defined as:

$$\Delta\tau = \cos^{-1}(2\, P(f)_{min}/P(f)_{max}{}^{-1})/(2\pi f)$$

$$DL \propto P(f)_{max}.$$

9. The monitoring apparatus of claim 7, wherein said optical distributor is an optical coupler that extracts optical signals received at a constant rate.

10. The monitoring apparatus of claim 7, wherein said filter has a center frequency falling within the frequency band of data signals when the data signals are applied to the received optical signals.

11. The monitoring apparatus of claim 7, wherein a center frequency of said filter corresponds to a frequency of a high-frequency pilot tone when data signals and extra pilot tone signals are applied to the received optical signals.

12. The monitoring apparatus according to claim 7, wherein the filter passes only over the frequency band of interest for measuring.

* * * * *